July 12, 1927.
A. O. ABBOTT, JR
1,635,243
VACUUM SHAPING MACHINE FOR TIRES
Filed Oct. 6, 1926
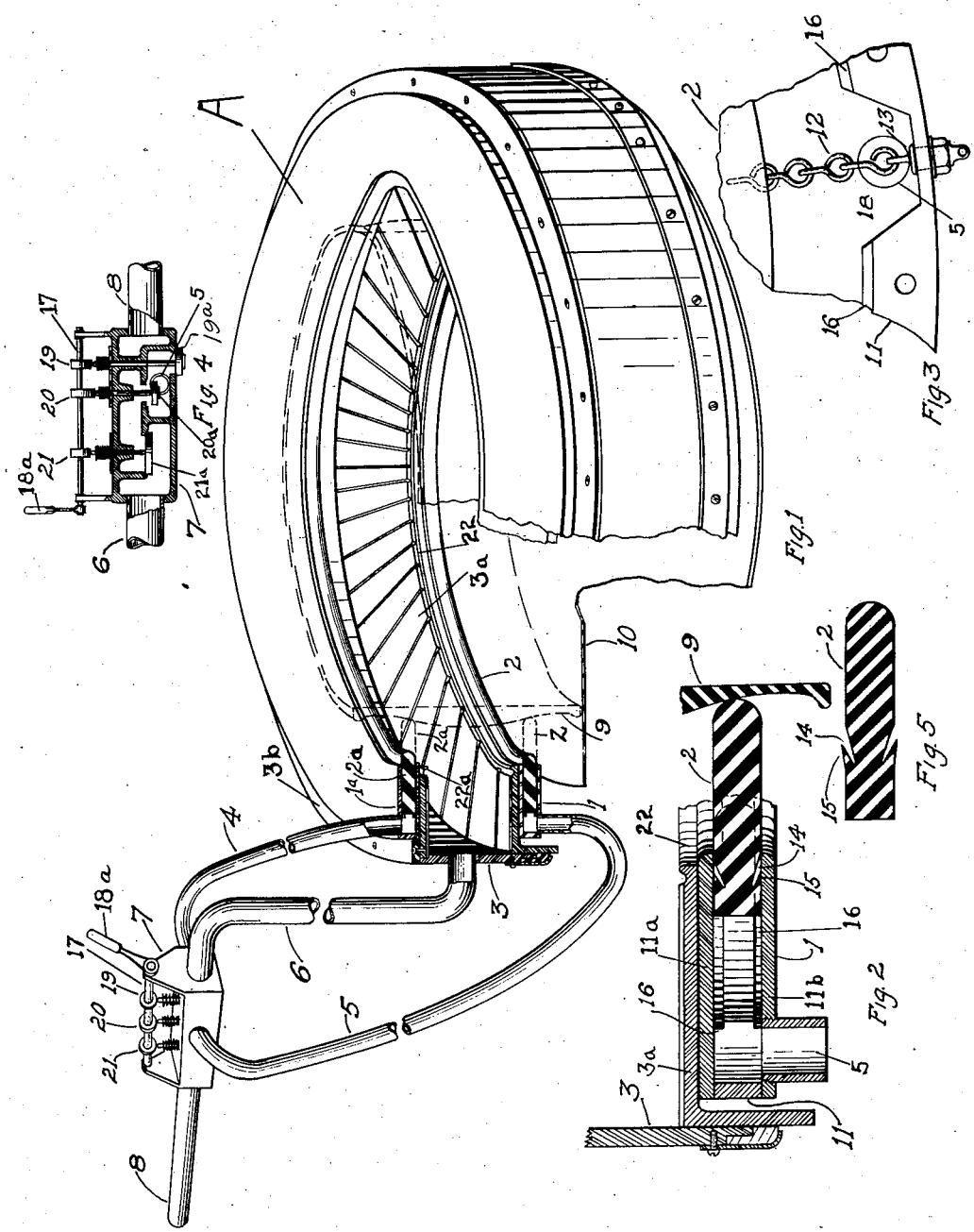
INVENTOR
Adrian O. Abbott Jr.
BY
Ernest H. Johnson
ATTORNEY Patented July 12, 1927.

1,635,243

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

VACUUM-SHAPING MACHINE FOR TIRES.

Application filed October 6, 1926. Serial No. 139,828.

This invention relates to apparatus for manufacturing tire casings by the vacuous method in which unshaped tire casing or so called "pulley bands" are brought to tire shape in a vacuum chamber and has for its primary object to provide an improved apparatus of this character which may be easily and rapidly operated.

Further objects are to eliminate clogging due to the presence of lubricating paint and powder used on the tire casing, to provide an improved initial or temporary sealing device, to eliminate manual operation of such device, to provide an improved method of controlling this device, and to provide an apparatus of this character which may be used either with straight side or clincher tire casings.

This apparatus is an improvement upon prior patent to Abbott, No. 1,507,563, granted September 9, 1924, and also upon the pending application of the same inventor, Serial No. 64,143, filed October 22, 1925. Reference may be made to said Abbott patent for a more complete understanding of the general construction and of the specific use for which the invention is intended.

The many other objects and advantages of my invention will be better understood by reference to the following specification when considered in connection with the accompanying drawing in which:

Fig. 1 is a perspective view, partially in section, of my improved vacuum chamber, the parts being in position to receive a pulley band;

Fig. 2, an enlarged transverse sectional view of a portion of the apparatus showing the position of the parts at the start of the shaping operation;

Fig. 3, a detail plan view of one of the sealing ring retaining devices;

Fig. 4, an enlarged vertical section of the suction control mechanism; and,

Fig. 5, an enlarged transverse section of one of the sealing rings.

Referring to the drawings, the device consists primarily of a box or casing forming a hollow annular chamber A substantially U-shaped in cross section and open on its inner periphery. This chamber is generally supported on a suitable frame (not shown) as in other machines of this character. An adjustable support 10 is provided beneath this casing to center the unshaped tire casing or pulley band in the proper vertical position opposite the open face of the vacuum chamber. In Fig. 1 this pulley band as 9 is indicated in dotted lines, the parts of the apparatus being in their initial position to receive the same.

In the present embodiment, the casing or box forming the chamber A comprises a fixed outer wall 3 to which the support frame is preferably attached, an adjustable bottom wall 3ª and a top wall or lid 3ᵇ. This top wall or lid 3ᵇ is hinged to the outer wall 3 at any convenient place but preferably near the vacuum tube connection 4 which will be presently described.

A second annular vacuum chamber 1 is provided on the under face of the bottom plate 3ª. This chamber comprises an outer wall 11, a top wall 11ª and a bottom wall 11ᵇ, the chamber being open on its inner periphery like the main vacuum chamber A. An expansible sealing ring 2, preferably of soft rubber, operates within this chamber 1. This ring fits closely between the top and bottom walls of the casing 1 and normally projects from the casing substantially as indicated in Fig. 2. A tube as 5 communicates with the rear or outer portion of this chamber 1 and connects the same with a suction or vacuum line as 8. The sealing ring may be slitted on opposite sides as at 14 to provide lips as 15 to insure complete sealing action within the chamber 1. When suction is provided through the tube 5, a partial vacuum is produced in the chamber 1 in rear of the sealing ring. This causes the ring to be uniformly retracted in the chamber and thereby expanded in diameter from substantially the position indicated in dot in Fig. 1 to that shown in solid lines in such figure. The ring preferably has a normal inner diameter sufficiently small to fit snugly about the outer periphery of the smallest pulley band to be shaped in the apparatus and is expansible by the suction in the chamber 1 to a diameter which will clear the largest band. The outer wall 11 of the chamber 1 may be provided at intervals about its circumference with notches as 18 (Fig. 3) to receive ring retaining chains 12 as they collapse. These chains have their inner extremities attached to the ring 2 and their outer extremities secured to the wall 11 by suitable fasteners as 13. The chains do not interfere with the expansion and contraction of the ring in the chamber. Grooves as 16 are preferably provided in the outside wall 11 of the chamber 1 to insure complete vacuum action in this chamber.

On the upper face of the top wall 3^b of the casing or box forming the chamber A is a third annular vacuum chamber 1^a corresponding to the chamber 1 on the bottom plate and similarly containing a sealing ring as 2^a. A suction tube 4 communicates with the rear portion of this chamber.

A suction tube 6 communicates with the main vacuum chamber A. The tubes 4, 5 and 6 are connected to the main suction pipe 8 which leads to a vacuum tank (not shown) or other suitable suction apparatus. A control valve mechanism as 7 is preferably provided at the junction of the tubes 4, 5 and 6 with the pipe 8 and an advantageous construction is illustrated in detail in Fig. 4 of the drawing. A revoluble cam rod 17, manually operable by a handle 18^a, is provided with cams 19, 20 and 21 which operate the valves 19^a, 20^a and 21^a respectively. The valve 20^a controls the suction in the tubes 4 and 5 communicating with the sealing ring chambers and the valve 21^a performs a similar function for the tube 6 leading to the main vacuum chamber. The valve 19^a is adapted to connect the tubes 5 and 4 with the atmosphere for the purpose which will be presently described.

In the operation of the apparatus, the sealing rings 2 and 2^a are first retracted (distended) by opening the valve 20^a. The pulley band to be shaped is then inserted in the apparatus in the dotted position indicated in Fig. 1 with its lower edge resting on the properly adjusted support 10. The valve 20^a is next closed and the atmospheric valve 19^a opened, releasing the suction in the chambers 1 and 1^a and permitting the sealing rings to contract until the inner periphery of each fits snugly about the outer periphery of the band in the manner indicated in Fig. 2. At this point, the chamber A including the extension formed by the sealing rings is closed by the pulley band and the apparatus is in readiness for the shaping of the band. The valve 19^a is then closed and the valves 20^a and 21^a opened, producing a suction in the chambers A, 1, and 1^a. This causes the pulley band to be drawn into the chamber A and the sealing rings to be simultaneously withdrawn into their respective chambers but at no time are the rings separated from the band until the band has come into contact with the fixed edges 22 and 22^a and the final seal of the shaped pulley band on the chamber A has been thereby formed. This shaping operation is completed when the pulley band has been drawn into the chamber A to substantially tire form, so that a vulcanizing bag, for instance, may be introduced with facility.

After a casing has been shaped, it may be mounted upon a "bag" or otherwise prepared for vulcanization. The bag is preferably introduced before the vacuum (partial) within chamber A is broken, but if time permits, subsequently. The lid 3^a is now lifted, and the casing and the bag (if inserted) removed. Bead rings are applied either before or after removal from the apparatus and the assemblage placed in a vulcanizing mold.

From the foregoing description it will be evident that the elastic sealing rings are quickly and easily expanded by suction to facilitate the insertion of the pulley band or casing to be formed and when released form an effective initial or temporary seal for the main vacuum chamber. The expansion of these rings by suction directly applied thereto simultaneously with the expansion of the pulley band may be dispensed with and the rings expanded by the rearward or outward movement of the pulley band, but I have found it more advantageous to utilize the direct suction in order to relieve friction as previously mentioned and thereby facilitate the expansion of the band. Powder or lubricating paint used on the tire casings does not interfere with the operation of the rings.

The particular valve mechanism for controlling the suction in the various chambers forms no part of the present invention and is shown solely for the purpose of illustration. Any other suitable controlling means might be substituted therefor. The flaps 15 on the rings assist in maintaining the seal within their respective chambers and the grooves 16 insure complete vacuum action.

The sealing rings 2 may be of any suitable and desired construction but are preferably made of vulcanized rubber composition, with or without suitable incorporated fibrous material such as fibres, fabric on the bias or distensible cords. But obviously if fibres fabric or cords are incorporated in the composition, the capacity of the rubber rings 2 to distend and contract in operation should not be impaired. While it is preferred to vary the size of the rubber rings 2 by means of the application of a vacuum to one circumference of these rings because of the uniform application of an unbalanced atmospheric pressure to the other circumference, variations in the girth and position of the sealing rings 2 may be accomplished, with possibly less uniformity, by mechanical means such as springs or a multiplicity of more or less radially arranged elements operable from the exterior of the vacuum chamber A. Obviously also the rubber ring 2 may be normally of the greatest required diameter and may be caused to contract by compressing it uniformly about its girth by means of super-atmospheric pressure applied externally or by mechanical means, but such modifications do not seem as desirable as the preferred construction. While the rubber ring 2 is shown and described as a complete annulus, it may be made in one or more sections joined together in any manner to form a band or ring operatively complete within the principle underlying the detailed and preferred construction. In other words, the conditions that have been mentioned in connection with the operation of the preferred form of construction may be reversed or altered. While such modifications as these are comprehended within the broadest aspects of the invention, the construction preferred is a vulcanized rubber composition ring 2 shiftable by the development of differential pressures on the faces thereof.

The sealing ring needs no adjustment for different sizes of pulley band and the apparatus may be operated without the exercise of mechanical skill. The apparatus may be used with either straight side or clincher type tires but is particularly advantageous with the straight side type.

I am aware that the form and arrangement of parts may be varied without departing from the spirit of my invention and contemplate all changes therein as fall within the scope of the following claims, as well as all uses in the manufacture of rubber articles to which the apparatus may be put.

In the claims, the term "pulley-band" is used to define a flat built as distinguished from a core built casing. In the former, the constituent plies, chafing strips, breaker strips (if any), and generally also cushion stocks and tread stocks, are assembled flat, or substantially flat, in cross-section, preferably with the beads in the same plane as the plies between the beads but sometimes with the beads bent more or less to approximate their position in the finished tire. And the term "pulley-band" is employed broadly to comprehend all forms of casings which are not built on a core approximating the form and shape in which the casing is cured.

Having thus described my invention, what I claim and desire to protect by Letters Patent is:—

1. An apparatus for manfacturing tire casings comprising in combination means for applying a differential pressure to opposite faces of a pulley-band to transform it to approximate tire form, yielding means for maintaining a seal with a face of the pulley-band during its shaping, and means for varying the girth of said yielding means.

2. An apparatus for manufacturing tire casings comprising in combination means for applying less than atmospheric pressure to the outside of a pulley-band while subjecting its inside face to atmospheric pressure to transform it from flat to approximate tire form, means for maintaining a seal on the outside of the pulley-band during its shaping, and vacuous means for operating the sealing means.

3. An apparatus for manufacturing tire casings comprising in combination a hollow annular chamber open on its inner periphery, means for evacuating the same when the inner periphery is closed, shiftable means for closing the space between the inner periphery of the hollow annular chamber and a pulley-band being shaped therein, and fluid pressure means for operating said shiftable means.

4. An apparatus for manufacturing tire casings comprising a hollow annular chamber open on its inner periphery, means for exhausting air therefrom, in combination with rings of extensible composition projecting beyond the inner periphery of said chamber, and means for varying the girth of said rings.

5. An apparatus for manufacturing tire casings comprising a hollow annular chamber open on its inner periphery, means for exhausting air therefrom, in combination with rings of extensible composition projecting beyond the inner periphery of said chamber and shiftably mounted thereon, and means for varying the girth of said rings.

6. An apparatus for manufacturing tire casings comprising a hollow annular chamber open on its inner periphery, means for exhausting air therefrom, in combination with rings of extensible composition projecting beyond the inner periphery of said chamber and slidably housed in cooperative relation thereon, and means for varying the girth of said rings.

7. An apparatus for manufacturing tire casings comprising a hollow annular chamber open on its inner periphery, means for exhausting air therefrom, in combination with rings of extensible composition projecting beyond the inner periphery of said chamber, and fluid pressure means for varying the girth of said rings.

8. An apparatus for manufacturing tire casings comprising a hollow annular chamber open on its inner periphery, means for exhausting air therefrom, in combination with rings of extensible composition projecting beyond the inner periphery of said chamber and slidably housed thereon, and fluid pressure means for varying the girth of said rings.

9. An apparatus for manufacturing tire casings comprising a hollow annular chamber open on its inner periphery and of a diameter loosely receiving a pulley-band, elastic members for closing the gap between the inner periphery of said chamber and a pulley-band, and evacuating means for simultaneously exhausting the air from said chamber and from one face of each member, whereby to simultaneously shape the casing to approximate tire form and maintain a seal on opposite sides of said chamber between it and the casing.

10. An apparatus for manufacturing tire casings having a hollow annular chamber open on its inner periphery, and means for evacuating said chamber, in combination with sealing rings of size-variable composition, and means for varying the size of said rings to shift them relative the inner periphery of said chamber.

11. An apparatus for manufacturing tire casings by the vacuous method having a hollow annular chamber open on its inner periphery, in combination with sealing rings of a composition permitting them to be varied in size and of a cross-section capable of substantially retaining their shape in operation, and means for substantially uniformly varying the size of said rings whereby to vary the effective inner periphery of the hollow annular chamber during operation upon a tire casing being treated.

12. An apparatus for manufacturing tire casings having a hollow annular chamber open on its inner periphery, and means for evacuating said chamber, in combination with elastic sealing rings operatively supported by said hollow annular chamber so as to normally project beyond its inner periphery, and means for varying the girth of said rings at will.

13. In apparatus for manufacturing tire casings by the vacuous method, a hollow annular chamber open on its inner periphery and a continuous elastic sealing ring having its inner edge portion normally projecting beyond one of the edges of the chamber wall to form an extension thereof, and pneumatic means for varying the inner diameter of said ring.

14. In apparatus for manufacturing tire casings by the vacuous method, a main hollow chamber open on its inner annular periphery and having top and bottom walls, the inner edges of which are of a diameter greater than the casing being manufactured, an auxiliary hollow chamber mounted on the outer face of each of said walls and having its inner periphery open, a sealing member fitting within each of said auxiliary chambers and normally having its inner marginal portion projecting therefrom to form an extension of the corresponding wall of the main chamber, the inner diameter of said sealing member being normally not greater than the outer diameter of the opposing portion of said casing, and means for drawing said sealing members into their respective chambers to increase the girth thereof.

15. In apparatus for manufacturing tire casings by the vacuous method comprising a hollow annular chamber open on its inner periphery and having substantially rigid top and bottom walls the inner margins of which are of a diameter not less than the outside diameter of the casing to be shaped, elastic sealing rings mounted on said walls and normally forming an inwardly projecting extension thereof to contact with said casing and form therewith a closure for the open side of said chamber, and means for uniformly distending said rings to increase the girth thereof.

16. In an apparatus for manufacturing tire casings the combination with a non-collapsible vacuum chamber having relatively fixed top and bottom walls of an internal diameter exceeding the diameter of a casing to be shaped, and means for exhausting said chamber, of rings of elastic material for closing the space between the inner free edges of the chamber and the casing to be shaped, said rings being variable in girth.

17. In an apparatus for manufacturing tire casings the combination with a non-collapsible vacuum chamber having relatively fixed top and bottom walls of an internal diameter exceeding the diameter of a casing to be shaped, and means for exhausting said chamber, of rings of elastic material for closing the space between the inner free edges of the chamber and the casing to be shaped, said rings being bodily expansible and shiftable.

18. In an apparatus for manufacturing tire casings the combination with a non-collapsible vacuum chamber having relatively fixed top and bottom walls of an internal diameter exceeding the diameter of a casing to be shaped, and means for exhausting said chamber, of rings of elastic material for closing the space between the inner edges of the vacuum chamber and a casing to be shaped, and guiding means confining said rings to expansion or contraction substantially radially of the chamber.

Signed at Detroit, county of Wayne, State of Michigan, this 1st day of October, 1926.

ADRIAN O. ABBOTT, Jr.